United States Patent [19]

Morita et al.

[11] 3,961,021

[45] June 1, 1976

[54] METHOD FOR REMOVING SULFUR DIOXIDE FROM COMBUSTION EXHAUST GAS

[75] Inventors: Tomijiro Morita; Akio Kobayashi; Isao Funahashi; Toshiharu Matsuda; Makoto Naoki, all of Iwaki; Naoyuki Kawamata, Kobe; Jun Fukui, Tokyo, all of Japan

[73] Assignee: Kureha Kagaku Kogyo Kabushiki Kaisha, Tokyo, Japan

[22] Filed: Sept. 17, 1974

[21] Appl. No.: 506,721

[30] Foreign Application Priority Data

Sept. 25, 1973 Japan............................. 48-107807
Jan. 8, 1974 Japan................................. 49-5431

[52] U.S. Cl................................ 423/242; 423/166
[51] Int. Cl.²................... C01F 11/46; B01D 53/34
[58] Field of Search........................... 423/242–244, 423/166

[56] References Cited
UNITED STATES PATENTS

| | | |
|---|---|---|
| 3,485,581 | 12/1969 | Miller et al. ........................ 423/242 |
| 3,556,722 | 1/1971 | Owaki ................................ 423/242 |
| 3,775,532 | 11/1973 | Shah .................................. 423/541 |
| 3,840,638 | 10/1974 | Morita et al. ...................... 423/242 |

*Primary Examiner*—Oscar R. Vertiz
*Assistant Examiner*—Gregory A. Heller
*Attorney, Agent, or Firm*—Lane, Aitken, Dunner & Ziems

[57] ABSTRACT

Sulfur dioxide can be removed from a combustion exhaust gas and converted to gypsum by first scrubbing a sulfur dioxide-containing combustion exhaust gas with an aqueous alkali sulfite solution to form an alkali bisulfite-containing aqueous solution and then treating, within a closed system, the thus formed aqueous bisulfite solution with a calcium compound. The efficiency of the sulfur dioxide removal can be increased greatly by adding a portion of alkali sulfite aqueous solution circulating in the system to at least a portion of filtrate from the gypsum separation process to precipitate metallic ionic impurities contained in the filtrate in the form of salts and separate these salts by filtration, and then recirculating the filtrate from the salt separation process to the absorption system.

18 Claims, 2 Drawing Figures

METHOD FOR REMOVING SULFUR DIOXIDE FROM COMBUSTION EXHAUST GAS

FIELD OF THE INVENTION

This invention relates to a method for removing sulfur dioxide from a combustion exhaust gas and, more particularly, to a method for removing sulfur dioxide and conversion to gypsum with high efficiency.

BACKGROUND OF THE INVENTION

It has previously been proposed to remove sulfur dioxide from a combustion exhaust gas with conversion to gypsum by scribbing with an alkali sulfite aqueous solution to form an alkali bisulfite-containing aqueous solution and then reacting with a calcium compound. The reaction of sulfur dioxide with the aqueous sulfite solution, produces an alkali bisulfite-containing aqueous solution, to which is then added a calcium compound such as slaked lime (calcium hydroxide) or calcium carbonate to form calcium sulfite. This calcium sulfite is, after separation, then oxidized into gypsum (calcium sulfate). The filtrate from the calcium sulfite separation process is an alkali sulfite aqueous solution and is recirculated to the sulfur dioxide absorption vessel. To oxidize the calcium sulfite, water is added to the calcium sulfite to form a slurry into which oxygen is injected to form gypsum. The filtrate removed from the gypsum separation process is water containing alkali sulfate in some quantity which, together with the filtrate removed from the calcium sulfite separation operation, is used as an alkali sulfite aqueous solution for absorbing sulfur dioxide. Calcium sulfite maay be slurried by mixing with the filtrate from the gypsum filter, thus avoiding the need to supply water from an external source. This method will permit an adjustment of the water balance within the system. Another feature of the foregoing process is that it is effected within a closed system.

Where sodium sulfite is used as the alkali sulfite and calcium hydroxide as the calcium compound, the reaction mechanism of the foregong method may be expressed by the following reaction formulas (1), (2) and (3):

$$Na_2SO_3 + SO_2 + H_2O \rightarrow 2NaHSO_3 \, TM \quad (1)$$

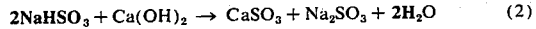
$$2NaHSO_3 + Ca(OH)_2 \rightarrow CaSO_3 + Na_2SO_3 + 2H_2O \quad (2)$$

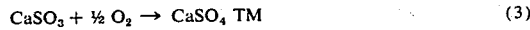
$$CaSO_3 + \tfrac{1}{2} O_2 \rightarrow CaSO_4 \, TM \quad (3)$$

A disadvantage of the foregoing method is that, during the reaction between the alkali sulfite aqueous solution and sulfur dioxide contained in the combustion exhaust gase, a portion of the alkali sulfite will be oxidized with oxygen contained in the combustion exhaust gas to form an alkali sulfate which will be accumulated in the alkali bisulfite-containing aqueous solution. The increase in the quantity of the accumulated alkali sulfate represents a reduction in the quantity of alkali sulfite available for reaction with the sulfur dioxide. This in turn will reduce the efficiency of removal of the sulfur dioxide from the combustion exhaust gas. To eliminate this disadvantage it has been proposed to remove the accumulated alkali sulfate from the alkali bisulfite-containing aqueous solution, for example, by externally adding sulfuric acid and calcium sulfite to said aqueous solution. Thus, the accumulated alkali sulfate will be converted into gypsum which may be separated. This reaction is expressed by the following formulas (4) and (5), wherein sodium sulfate employed as the alkali sulfate.

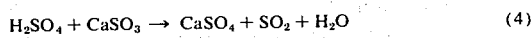
$$H_2SO_4 + CaSO_3 \rightarrow CaSO_4 + SO_2 + H_2O \quad (4)$$

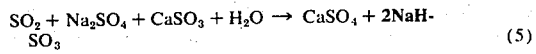
$$SO_2 + Na_2SO_4 + CaSO_3 + H_2O \rightarrow CaSO_4 + 2NaHSO_3 \quad (5)$$

The filtrate removed from the gypsum separation process is an alkali bisulfite-containing aqueous solution, which can be reused within the system and thus the entire process can be effected within a closed system.

In the foregoing reactions carried out within a closed system, it is inevitable, however, that various metal ions are introduced into the system. These metals may include a slight amount of nickel originating in the heavy fuel oil and introduced into the system by the combustion exhaust gas and other metals such as magnesium and iron introduced with the calcium compound. The presence of such metallic ion impurities reduces the efficiency of sulfur dioxide removal. This is because the metallic ion impurities will be converted into sulfates or sulfites, and then oxidized into sulfates by the oxygen contained in the combustion exhaust gas and also by a portion of the oxygen introduced for the purpose of oxidizing calcium sulfite to gypsum, and the metallic sulfates will, in turn, react with the alkali sulfite contained in solution, forming alkali sulfates. It is believed that the foregoing series of reactions proceed in the manner indicated by the following reaction formulas (6), (7) and (8), wherein the metallic ion impurity is expressed as $Mg^{++}$ by way of example and sodium sulfite is the alkali sulfite.

$$Mg^{++} \rightarrow MgSO_4 \text{ or } MgSO_3 \quad (6)$$

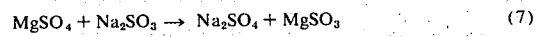
$$MgSO_4 + Na_2SO_3 \rightarrow Na_2SO_4 + MgSO_3 \quad (7)$$

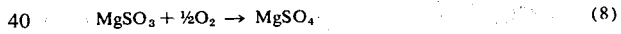
$$MgSO_3 + \tfrac{1}{2}O_2 \rightarrow MgSO_4 \quad (8)$$

As metallic ion impurities in increasingly larger quantities are accumulated in the system, accumulated alkali sulfate will also increase in quantity and accordingly the alkali sulfite available for reaction with sulfur dioxide will be correspondingly reduced in quantity. Experiments indicate that the double decomposition reaction, which is solid-liquid heterogeneous reaction between, for example, $NaHSO_3$ and $Ca(OH)_2$ as expressed by formula (2), is greatly impeded by the presence of several hundreds ppm of $Ni^{++}$ in the alkali bisulfite-containing aqueous solution. To avoid the danger that the metallic ion impurities will accumulated in the system, it may be necessary to discard the filtrate the gypsum separation step. Discarding the filtrate, however, makes it impossible to carry out the sulfur dioxide removal within a closed system and the useful alkali valves, once reacted with sulfur dioxide, are wasted without being reused. Also, the disposed filtrate will pose a potential environmental pollution problem.

In view of the foregoing, in the removal of sulfur dioxide from a combustion exhaust gas and conversion to gypsum by treating, within a closed system, the sulfur dioxide containing combustion exhaust gas with an alkali sulfite aqueous solution and a calcium compound, it is preferred that metallic impurities be removed from the system.

SUMMARY OF THE INVENTION

It is therefore a primary object of this invention to provide a method for removing sulfur dioxide from a combustion exhaust gas by use of a closed system and at an improved efficiency by removing metallic impurities from the system in a highly effective manner.

This and other objects of this invention will become apparent from a reading of the following description.

It has now been discovered that metallic impurities contained in the filtrate from the gypsum filter can be precipitated in the form of salts by addition of an alkali sulfite aqueous solution to the filtrate.

Accordingly this invention provides a method for removing sulfur dioxide from a combustion exhaust gas in the form of gypsum by first scrubbing a sulfur dioxide-containing combustion exhaust gas with an alkali sulfite aqueous solution to produce an alkali bisulfite-containing solution and then treating, within a closed system, the bisulfite solution with a calcium compound, with the metallic impurities contained in the filtrate from the gypsum filter being precipitated in the form of salts by adding a portion of the alkali sulfite aqueous solution circulating in the closed loop system to at least a portion of the filtrate, then the thus precipitated salts are separated by filtration and this filtrate is reintroduced into the system.

DETAILED DESCRIPTION OF THE INVENTION

Figure 1:
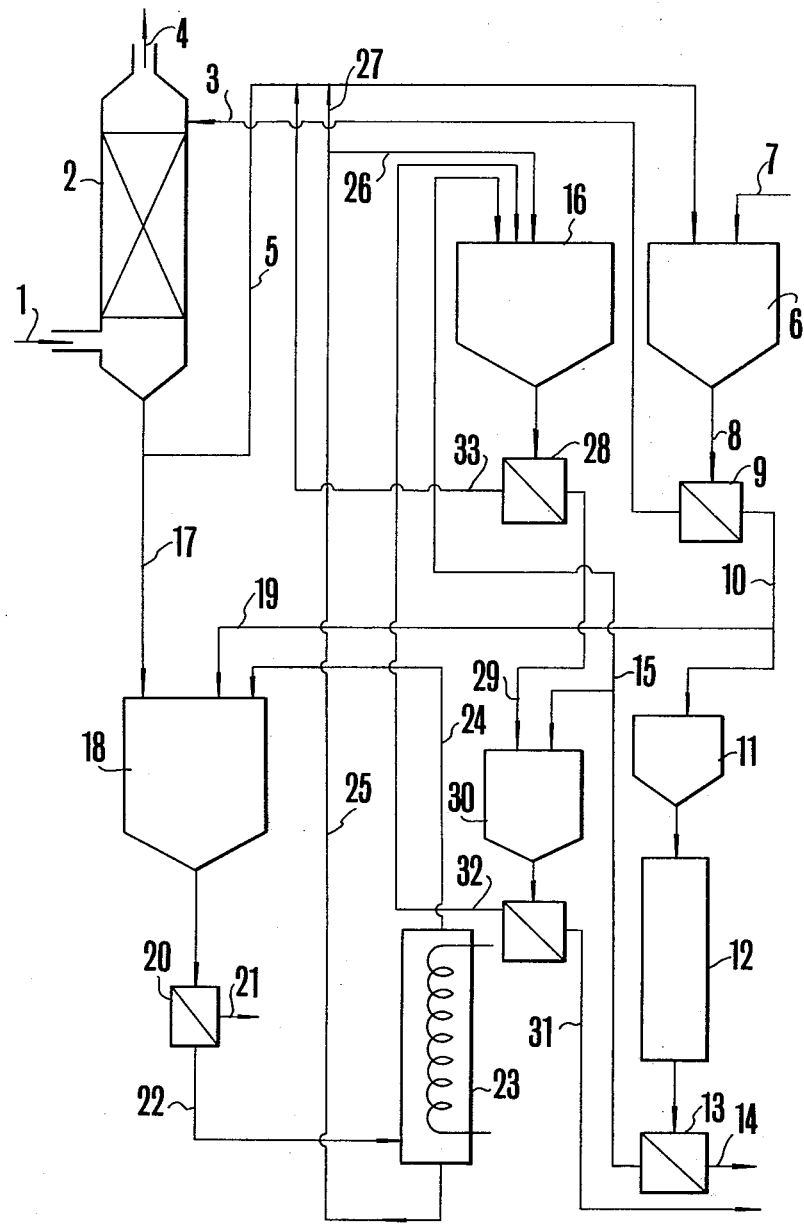
FIG. 1 is a flow sheet for the process for removing sulfur dioxide from a combustion exhaust gas according to one embodiment of this invention.

As mentioned previously, in removing sulfur dioxide from a combustion exhaust gas in the form of gypsum by treating, within a closed system, the combustion exhaust gas with an alkali sulfite aqueous solution and a calcium compound such as calcium hydroxide, calcium carbonate or calcium oxide, the impurity metallic ions derived from the fuel and from the calcium compound will be introduced into and accumulated in the system. For example, it is inevitable that metallic impurities such as Fe and Mg ions will be introduced into the system where typical commercially available natural limestones having the following chemical compositions are used as the calcium compound:

Limestone (A): loss of ignition, 43.72%; $Fe_2O_3$, 0.10%; CaO, 54.20%; MgO, 0.54%.
Limestone (B): loss of ignition, 44.57%; $Fe_2O_3$, 0.03% CaO, 48.10%; MgO, 6.38%.

More specifically, in the process for absorbing sulfur dioxide by reaction with natural limestone to form calcium sulfite (cf. reaction formula 2), Ni ions derived from the fuel and Fe and Mg ions derived from the natural limestone will be precipitated together with the calcium sulfite ($CaSO_3$) mainly in the form of metallic sulfites. These metallic sulfites will be separated together with calcium sulfite. Consequently, upon oxidizing the calcium sulfite, the metallic sulfites will be oxidized simultaneously into metallic sulfates. Being highly soluble, these metallic sulfates will remain dissolved in the filtrate from the gypsum separation process and will be recirculated in the system.

Therefore, according to this invention the metallic ion impurities contained in the filtrate from the gypsum separation process are removed by precipitation in the form of salts by adding a portion of the alkali sulfite aqueous solution circulating in the system to at least a portion of the filtrate from the gypsum separation process. As mentioned previously, the metallic impurities are dissolved in the filtrate in the form of sulfates. These metallic sulfates react with the alkali sulfite contained in the circulating alkali sulfite aqueous solution as expressed by formula (7) to form sulfites. These sulfites have low solubility in water and are easily removed by precipitation (for example, the watersolubility of $MgSO_4$ is 35.5% at 60° C and 38.6% at 80° C; whereas a sulfite (e.g. $MgSO_3 \cdot 6H_2O$) obtained from the reaction between $MgSO_4$ and an alkali sulfite has a relatively low watersolubility of 1.23% in cold water and 0.82% in boiling water). The liquid from the metallic sulfite separation process can be recirculated in the system without the danger that metallic ions will accumulate in the system. To induce rapid precipitation of said metallic ions in the form of sulfites, it is preferred that the reaction between the metallic sulfates and alkali sulfites be conducted at a temperature of 40° – 90° C and a pH 5 – 9. In one experiment, a filtrate from the gypsum separation process ($Na_2SO_4$, 4.25%; $H_2SO_3$, 0.17%; $MgSO_4$, 8.1%) and an alkali sulfite aqueous solution from the circulating loop of the system ($NaHSO_3$, 6%; $Na_2SO_3$, 7.99%; $Na_2SO_4$, 8%) were introduced into a preselected vessel at flow rates of 30 kg/h and 5 kg/h, respectively, and mixed together. In the thus obtained liquid mixture, the $Na_2SO_3$ converted concentration was 6.3% and the $MgSO_4$ concentration was 6.95% (Mg ion concentration, 1.49%). The liquid mixture was allowed to react for 1 hour at a temperature of 40° C, yielding a precipitated magnesium salt. After separating the magnesium salt by filtration, the Mg ion concentration in the filtrate was 1.29% and therefore the rate of magnesium removal filtrate was 13%. The term "$Na_2SO_3$-converted concentration" means the Na concentration in the solution containing $NaHSO_3$ and $Na_2SO_4$ expressed in terms of $Na_2SO_3$, that is, the "$Na_2SO_3$-converted concentration" is the total value of the $Na_2SO_3$ concentration, the $NaHSO_3$ concentration multiplied by 126/208 and the $Na_2SO_4$ concentration multiplied by 126/142. When the reaction between the metallic sulfates and the alkali sulfite is effected at a relatively higher temperature, the metallic salt precipitate is not in the form of sulfites but rather in the form of double salts of alkali sulfites (e.g. $MgSO_3 \cdot Na_2SO_3 \cdot 2H_2O$). Separation and removal of the double salts would be a loss of alkali value and therefore the double salts are hydrolyzed by adding water or filtrate from the gypsum separation process, having a water content of more than 85%, to the double salts and holding the resulting mixture at a temperature lower than 45° C. The thus hydrolyzed double salts are then precipitated in the form of metallic sulfites which can be separated by filtration and removed from the system, and the filtrate from these sulfites separation process may likewise be reintroduced into the system. While alkali sulfate is also produced as by-product from the reaction between the metallic sulfates and alkali sulfite (cf. formula 7), this alkali sulfate may be subjected to the reactions represented by formulas (4) and (5) and removed from the system in any suitable manner.

In the process of removing sulfur dioxide from a combustion exhaust gas by use of an alkali sulfite aqueous solution, as previously described, a portion of the alkali sulfite contained in solution will be oxidized with oxgen to form an alkali sulfate which will be accumulated in the system. For the purpose of elminating this problem to a portion of the alkali bisulfite-containing aqueous solution is added calcium sulfite and sulfuric acid or sulfur dioxide to eliminate the thus accumulated alkali sulfate. Sulfuric acid or sulfur dioxide produced as a by-product from a separate plant may be used for this purpose. Furthermore, sulfur dioxide generated by introducing the alkali bisulfitecontaining aqueous solution (obtained after separation of alkali sulfate therefrom) into the sulfur dioxide stripper, may be also used.

When a sulfur dioxide stripper is employed (FIG. 1), the effluent from the stripper may be advantageously added to the filtrate from the gypsum separation process since this effluent contains a high concentration of alkali sulfite.

It was found experimentally that when $Mg^{++}$ was introduced into an aqueous solution containing $Na_2SO_3$, $NaHSO_3$ and $Na_2SO_4$ the $Mg^{++}$ concentration in the aqueous solution decreased sharply with an increase in the $Na_2SO_3$-converted concentration and that this reduction in the $Mg^{++}$ concentration was especially evident at a $Na_2SO_3$-converted concentration of more than 10% and a liquid temperature above 50° C. For example, at a $Na_2SO_3$-converted concentration of 18 – 22% and at a liquid temperature of 80° C, the $Mg^{++}$ concentration in the aqueous solution was less than 450 ppm. If the metallic impurity to be removed is $Mg^{++}$, it will be sufficient that the aqueous solution having a $Na_2SO_3$-converted concentration of more than 10% contains $Na_2SO_3$ in an amount at least equimolar to $Mg^{++}$, preferably at least twice the molar amount of $Mg^{++}$. In other words, the presence in an amount $Na_2SO_3$ more than 3% of the aqueous solution will usually be enough for the purpose of this invention. The effluent from the sulfur dioxide stripper (of which the composition is, for example, $NaHSO_3$, 27.2%; $Na_2SO_3$, 10.2%; $Na_2SO_4$, 3.5%) has a comparatively large $Na_2SO_3$-converted concentration. This effluent is admixed with the filtrate from the gypsum separation process to give an aqueous solution containing metallic ions at an extremely reduced concentration. This feature raises the efficiency of removal of the metallic impurities.

Now the process of the invention will be described with reference to the accompanying drawings.

Illustrated in FIG. 1 is a flow sheet of the present process for removing sulfur dioxide from a combustion exhaust gas according to one embodiment of this invention. In the drawing, indicated at 2 is an absorption tower for treating a combustion exhaust gas. The combustion exhaust gas 1 containing sulfur dioxide is introduced into the absorption tower 2 at the bottom thereof and absorbed in and reacted with an absorbing liquid (alkali sulfite aqueous solution) which is sprayed into the absorption tower 2 at the top and allowed to flow down within the tower 2. Thus, sulfur dioxide is removed and the exhaust gas 4 which has been rendered harmless is discharged into atmosphere. The liquid which has absorbed sulfur dioxide and a pH of 6.1 – 6.7 is removed from the absorption tower 2 and fed, in part, into a double decomposition vessel 6 by way of a liquid feed pipe 5 and the remaining portion of the exiting liquid is fed through pipe 17 into a vessel 18 for reaction with alkali sulfate. Within the double decomposition vessel 6, the liquid is mixed and reacted with limestone 7. The calcium sulfite-containing aqueous solution exiting the double decomposition vessel 6 is then fed through pipe 8 into separator 9 and the filtrate from the separator 9 is recirculated to the absorption tower 2. The major part of the calcium sulfite removed by the separator 9 is then fed through pipe 10 into slurry preparation vessel 11 and slurried therein. The calcium sulfite slurry is then oxidized in an oxidizing tower 12 to form gypsum, which is then separated in filter 13 and recovered as indicated at 14. A portion of calcium sulfite separated in the separator 9 is fed through pipe 19 into the alkali sulfate conversion vessel 18 and mixed with the liquid introduced into the vessel 18 via pipe 17. Sulfur dioxide is also introduced into the vessel 18 by way of pipe 24 and reacted at temperature of 20° – 60° C (cf. formula 5). The gypsum-containing aqueous solution obtained from the reaction is then pass through filter 20 to recover gypsum as indicated at 21. The filtrate, on the other hand, is allowed to flow through pipe 22 into a sulfur dioxide stripper 23 for stripping sulfur dioxide at a temperature 105° – 110° C. At least a portion of the liquid exiting the sulfur dioxide stripper 23 is fed through pipes 25 and 26 into vessel 16 for forming double salts metallic impurities; whereas the remainder of the liquid is fed through pipes 25 and 27 into the double decomposition vessel 6. A portion of the filtrate from the gypsum filter is fed directly or through a hydrolyzing vessel 30 into the double salts forming vessel 16 and the remainder is fed into slurry preparation vessel 11. In vessel 16, the filtrate is reacted at a temperature of 50° – 90° C and at a pH of 5 – 9 with the portion of the liquid from the sulfur stripper fed through pipes 25 and 26 to form double salts consisted of magnesium sulfite or nickel sulfite and alkali sulfite. These double salts are then separated by filter 28 and transferred into vessel 30 through pipe 29, whereas the resulting filtrate is fed through pipe 33 into the double decomposition vessel 6. In the hydrolyzing vessel 30, the double salts are hydrolyzed with water or with a portion of filtrate from filter 13 and separated by filtration. The separated metallic sulfites are removed from the system by way of pipe 31, whereas the filtrate is recirculated to the double salt forming vessel 16 by way of pipe 32. By removing sulfur dioxide from the combustion exhaust gas in the foregoing manner, the accumulation of the impurity metallic ions in the system can be avoided.

In the process of this invention, it may also be possible that, depending on the locational or other conditions of the plant, the sulfur dioxide used to remove the alkalli sulfate accumulated in the system may be supplied from an external source in the form of $H_2SO_4$ or $SO_2$ which may be obtained from a separate plant as a by-product or in the form of commercially available $H_2SO_4$, instead of using the sulfur dioxide generated in the stripper. In this case, the liquid which is to be mixed with the filtrate removed the gypsum filter may be the liquid exiting absorption tower 2.

Figure 2:
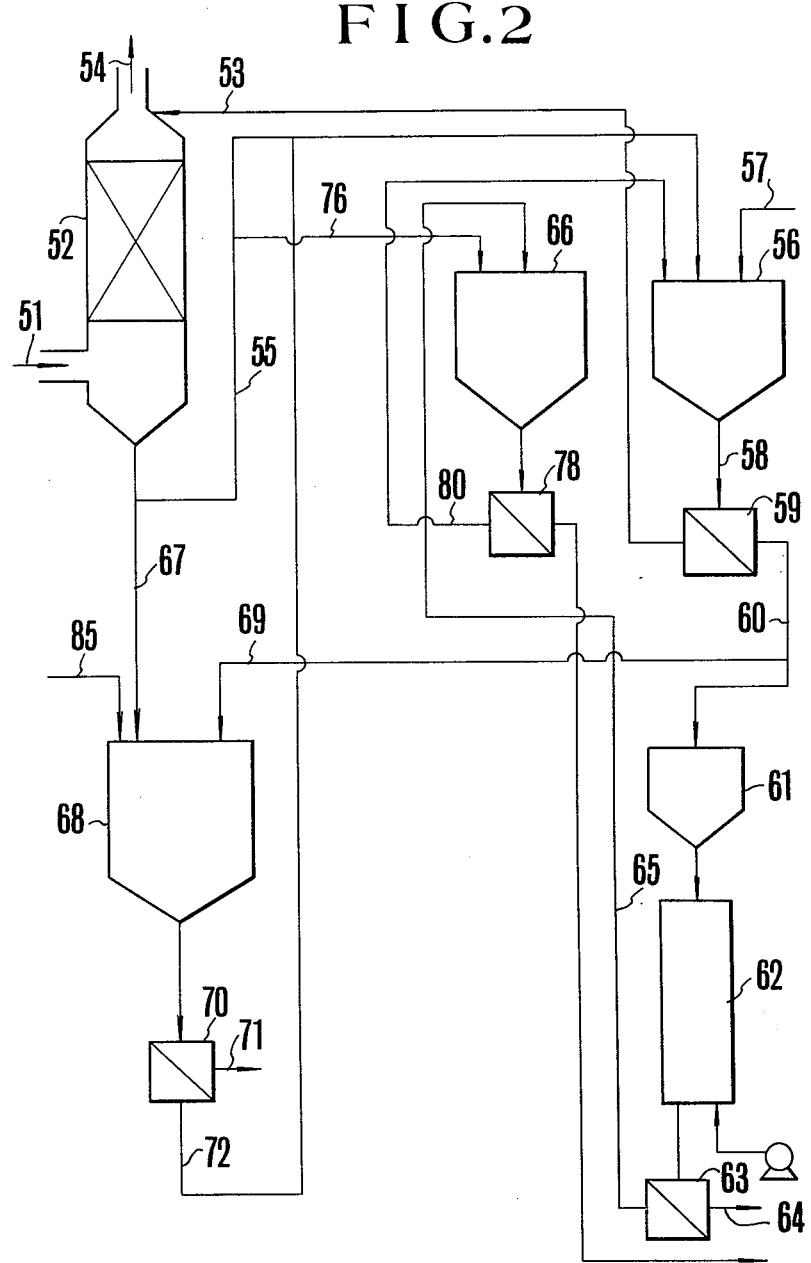
FIG. 2 is a flow sheet for the process for removing sulfur dioxide from a combustion exhaust gas according to another embodiment of this invention.

Illustrated in FIG. 2 is a flow sheet for another embodiment of this invention. In the drawing, indicated at 52 is an absorption tower for scrubbing a combustion exhaust gas. The combustion exhaust gas 51 containing sulfur dioxide is introduced into the absorption tower 52 at the bottom thereof and reacted with an absorbing liquid (alkali sulfite aqueous solution) which is sprayed into the absorption tower 52 near the top thereof.

Thus, sulfur dioxide is removed and the exhaust gas 54 which is now rendered harmless is discharged into atmosphere. The liquid containing absorbed sulfur dioxide and having a pH concentration of 6.1 – 6.7 is taken out of the absorption tower 52 and a portion is fed into a double decomposition vessel 56 by way of a liquid feed pipe 55 and the remainder of the liquid is fed through a pipe 67 into a vessel 68 for reaction with the alkali sulfate. Within the double decomposition vessel 56, the liquid is mixed and reacted with limestone entering at 57. The calcium sulfite-containing suspension from the double decomposition vessel 56 is then fed through a pipe 58 into filter 59 and the filtrate from the filter 59 is recirculated to the absorption tower 52. Most of the calcium sulfite separated in the filter 69 is then fed through a pipe 60 and formed into a slurry in vessel 61. The calcium sulfite slurry is then oxidized in oxidizing tower 62 to form gypsum, which is then separated in filter 63 and recovered as indicated at 64. A portion of calcium sulfite separated in filter 59 is fed through pipe 69 into the alkali sulfate vessel 68 and mixed with the liquid entering by way of pipe 67. Sulfuric acid or sulfur dioxide is introduced at 85 into the alkali sulfate conversion vessel 68 from a source external to the system. The sulfur dioxide, is reacted at a temperature of 20° – 60° C (cf. formulas 4 and 5). The gypsum-containing aqueous solution obtained from the reaction is then filtered in 70 to recover gypsum as indicated at 71. The filtrate from filter 70 is allowed to flow through pipe 72 into the double decomposition vessel 56. In the double salt forming vessel 66, the filtrate is reacted at temperature of 40° – 50° C at pH 5 – 9 with the filtrate from the absorption tower 52 to form metallic sulfites such as magnesium sulfite and nickel sulfite. The thus formed metallic sulfites are then separated by filter 78 and removed from the system, whereas the resulting filtrate is fed through pipe 80 into the double decomposition vessel 56.

It will be understood from the foregoing that the present invention provides a method for removing sulfur dioxide from a combustion exhaust gas by use of a closed system and at an extremely high efficiency.

EXAMPLE 1

A combustion exhaust gas 1 was treated in accordance with the method as described hereinbefore with reference to FIG. 1.

The combustion exhaust gas 1, containing 830 ppm of $SO_2$, was introduced into the absorption tower 2 at a flow rate of 4200 $Nm^3$/h and absorbed by a liquid entering the absorption tower 2 at a flow rate of 647 kg/h and containing 0.52% of $NaHSO_3$, 11.12% of $Na_2SO_3$ and 7.37% of $Na_2SO_4$. The absorption efficiency of $SO_2$ was 98.4% and the $SO_2$- containing liquid exiting at a rate of 619 kg/h had a pH of 6.2 and contained 6.02% $NaHSO_3$, 7.98% $Na_2SO_3$ and 8.10% $Na_2SO_4$. A portion of the $SO_2$-containing liquid was transferred into the alkali sulfate conversion vessel 18 at a flow rate of 31.2 kg/h. Within the vessel 18, a portion of calcium sulfite (12 kg/h) formed in the double decomposition vessel 6 was reacted with $SO_2$ generated in the stripper 23 to form sodium bisulfite and gypsum. After separating gypsum by filtration, the filtrate is allowed to pass through the stripper 23 to absorb $SO_2$. Then a portion of the filtrate was fed into the double salt forming vessel 16 and the remainder of the filtrate was fed into the double decomposition vessel 6 where it was reacted, together with the $SO_2$-containing liquid, with pulverized limestone to produce calcium sulfite at a rate of 27.6 kg/h. The pulverized limestone was fed into the double decomposition vessel 6 at a flow rate of 22 kg/h. The filtrate, from which the calcium sulfite had been separated, was then recirculated to the absorption tower 2. The remainder of calcium sulfite was fed to the oxidizing tower 12 and oxidized with air to form gypsum. Thus, gypsum was produced in the oxidizing tower 12 and in the alkali sulfate conversion vessel 18 at a total production rate of 36.1 kg/h. The liquid from the oxidizing tower 12 was separated to remove gypsum, producing a filtrate at a rate of 176.3 kg/h. The composition of the filtrate was as follows: $Na_2SO_4$, 3.73%; $H_2SO_3$, 0.17%; Mg, 4299 ppm; Ni, 1896 ppm; Fe, 500 ppm. Together with a concentrated liquid ($NaHSO_3$, 25.93%; $Na_2SO_3$, 9.82%; $Na_2SO_4$, 6.79%; Mg, 307 ppm) exiting the stripper at a rate of 43 kg/h, a portion of the filtrate was fed into the double salt forming vessel 16 at a rate of 21.5 kg/h and the reaction was effected for a period of 1 hour at temperature of 80° – 90° C. After reaction, double salts consisted of sodium sulfite and Mg-, Ni- and Fe-sulfites were separated at a rate of 0.1 kg/h. These double salts were then transferred into the hydrolyzing vessel 30 and hydrolyzed with the filtrate routed from the oxidizing tower 12 through the gypsum separation process. The filtrate was introduced in an amount about 10 times the weight of the double salts and was maintained at 30° C. The liquid from the hydrolyzing vessel 30 was then passed through a filter. The resulting filtrate which contained Mg, Ni and Fe was, in part, recirculated to the double salt forming vessel 16. Two hours after starting operation a steady reaction state was reached, wherein the double salts were produced at a rate of 2.1 kg/h and Mg-, Ni- and Fe-sulfites were produced by hydrolyzing the double salts at a rate of 0.75 kg/h. An analysis of these sulfites showed that about 94% consisted of $MgSO_3.6H_2O$ and the balance consisted of Ni- and Fe-sulfites. In the foregoing process, Mg was removed from the system at a rate of 0.081 kg/h. this Mg-removal rate was sufficient to prevent Mg from being accumulated in the system, because was higher than the rate of about 0.08 kg/h at which Mg was introduced into the system together with $CaSO_3$ which was used in the double decomposition process. It was also proved that no Ni and Fe was accumulated in the system. The filtrate from the double salt separation process was recirculated to the double decomposition vessel to provide a closed loop reaction system. The composition of the filtrate was as follows: Mg, 410 ppm; Ni, 12 ppm; Fe, 10 ppm.

EXAMPLE 2

A combustion exhaust gas 51 was treated in accordance with the method as described hereinbefore with reference to FIG. 2.

The combustion exhaust gas 51, containing 830 ppm of $SO_2$, was introduced into the absorption tower 52 at a flow rate of 4200 $Nm^3$/h to absorb $SO_2$. The liquid circulating through the combustion exhaust gas treating process was used as the alkali sulfite aqueous solution for removing Mg ions present within the system. More specifically, the liquid was mixed with the filtrate from the gypsum separation process and maintained at 40° C to precipitate Mg salts. The composition of the filtrate from the gypsum separation process was as follows: $Na_2SO_4$, 4.25%; $H_2SO_3$, 0.17%; $Mg^{++}$, 1.6%. The filtrate was introduced into the salt forming vessel 66 at a flow rate of 30 kg/h. The alkali sulfite aqueous solution from the absorption tower 52, containing 6% of $NaHSO_3$, 7.99% of $Na_2SO_3$ and 8% of $Na_2SO_4$ was introduced into this vessel 66 at a flow rate of 5 kg/h. The mixture (Mg ion concentration, 1.49%) was retained for 1 hour within the vessel 66 at 40° C for reaction to precipitate magnesium salt. The resulting magnesium salt was then separated by filtration. The filtrate from this magnesium salt separation process proved to have a Mg ion concentration reduced to 1.25%. About 95% of the thus precipitated magnesium salt was $MgSO_3.6H_2O$. In the foregoing process, Mg was removed from the system at a rate of 0.084 kg/h.

What is claimed is:

1. A method for removing sulfur dioxide from combustion exhaust gas and converting the sulfur dioxide to gypsum, said process comprising:

contacting the sulfur dioxide containing combustion exhaust gas with an aqueous solution containing an alkali sulfite to absorb the $SO_2$ as bisulfite;

reacting said alkali bisulfite in solution with a calcium compound containing metallic impurities to form a mixture of calcium sulfite, metallic sulfite impurities, and an aqueous solution containing alkali sulfite;

separating at least a portion of the alkali sulfite solution from said mixture and returning said portion to the sulfur dioxide contacting step, thereby forming a sulfite circulation loop;

forming an aqueous slurry of said calcium sulfite and metallic sulfites;

oxidizing said slurry to form gypsum and an aqueous solution containing the metallic impurities dissolved in the form of sulfates;

separating said gypsum from solution to leave a first effluent containing the dissolved metallic sulfate impurities;

mixing at least a portion of said first effluent with alkali sulfite for reaction to form a precipitate of metallic sulfites and soluble alkali sulfate; and separating said precipitate of metallic sulfites from solution and returning the remaining solution to the sulfite circulation loop.

2. The process of claim 1 additionally comprising:

reacting at least a portion of said bisulfite solution, said bisulfite solution containing dissolved alkali sulfate, with at least a portion of said calcium sulfite and sulfur dioxide or sulfuric acid to form a second bisulfite solution and calcium sulfate; and separating said calcium sulfate from solution and recirculating said second bisulfite solution to said sulfite circulation loop.

3. The process of claim 2 wherein said sulfur dioxide is formed by heating at least a portion of one of said bisulfite solutions to strip off sulfur dioxide gas, leaving a second effluent containing alkali sulfite.

4. The process of claim 3 wherein at least a portion of said second effluent is returned to the sulfite circulation loop.

5. The process of claim 3 wherein at least a portion of said second effluent is mixed with said first effluent for reaction to form the precipitate of metallic sulfites.

6. The method of claim 1 wherein the solution in the sulfite circulation loop contains more than 3% by weight sodium sulfite and has a $Na_2SO_3$-converted concentration of more than 10%.

7. The process of claim 1 wherein said first effluent is mixed with alkali sulfite at 40°–90° C. and the pH of the resultant solution is adjusted to a value within the range of 5–9 to precipitate the metallic sulfites.

8. The process of claim 1 wherein said portion of said first effluent is reacted with a solution diverted from the sulfite circulation loop.

9. A method for removing sulfur dioxide from combustion exhaust gas and converting the sulfur dioxide to gypsum, said process comprising:

contacting the sulfur dioxide containing combustion gas with an aqueous solution containing an alkali sulfite to absorb the $SO_2$ as bisulfite, thus forming a bisulfite-enriched solution;

reacting said bisulfite-enriched solution with a calcium compound containing metallic impurities to form a mixture of calcium sulfite, sulfites of metallic impurities, and an aqueous solution containing alkali sulfite;

separating at least a portion of the alkali sulfite solution from said mixture and returning said portion to the sulfur dioxide contacting step, thereby forming a sulfite circulation loop;

forming an aqueous slurry of said calcium sulfite and metallic sulfites;

oxidizing said slurry to form gypsum and an aqueous solution containing the metallic impurities dissolved in the form of sulfates;

separating said gypsum from solution to leave a first effluent containing the dissolved metallic sulfates;

mixing at least a portion of said first effluent with alkali sulfite for reaction to form a precipitate of double salts of said alkali and said metallic impurities;

separating said precipitate from solution;

hydrolyzing said precipitate of double salts to form a precipitate of metallic sulfites; and separating said precipitate of metallic sulfites from solution and returning the remaining solution to the sulfite circulation loop.

10. The process of claim 9 additionally comprising:

reacting at least a portion of said bisulfite-enriched solution, said bisulfite solution containing dissolved alkali sulfate, with at least a portion of said calcium sulfite and with sulfur dioxide or sulfuric acid to form a second bisulfite solution and calcium sulfate; and separating said calcium sulfate from solution and recirculating said second bisulfite solution to said sulfite circulation loop.

11. The process of claim 10 wherein said sulfur dioxide is formed by heating at least a portion of one of said bisulfite solutions to strip off sulfur dioxide gas, leaving a second effluent containing alkali sulfite.

12. The process of claim 11 wherein at least a portion of said second effluent is returned to the sulfite circulation loop.

13. The process of claim 11 wherein at least a portion of said second effluent is mixed with said first effluent for reaction to form the precipitate of metallic sulfites.

14. The method of claim 9 wherein the solution in the sulfite circulation loop contains more than 3% by weight sodium sulfite and has a $Na_2SO_3$-converted concentration of more than 10%.

15. The process of claim 9 wherein said first effluent is mixed with alkali sulfite at 40°–90° C. and the pH of the resultant solution is adjusted to a value within the range of 5–9 to precipitate the metallic sulfites.

16. The process of claim 9 wherein said portion of said first effluent is reacted with a solution diverted from the sulfite circulation loop.

17. The method of claim 1 wherein said combustion exhaust gas contains metallic impurities and wherein said impurities include ions of at least one metal selected from the group consisting of magnesium, nickel and iron.

18. The method of claim 9 wherein said combustion exhaust gas contains metallic impurities and wherein said metallic impurities include ions of at least one metal selected from the group consisting of magnesium, nickel and iron.

* * * * *

UNITED STATES PATENT OFFICE
CERTIFICATE OF CORRECTION

Patent No. 3,961,021    Dated June 1, 1976

Inventor(s) Tomijiro Morita et al

It is certified that error appears in the above-identified patent and that said Letters Patent are hereby corrected as shown below:

On the title page, line 10, after "Japan", insert --and Kawasaki Jukogyo Kabushiki Kaisha, Tokyo Japan--.

Column 1, line 14, "scribbing" should read --scrubbing--;
　　　　　line 34, "maay" should read --may--;
　　　　　line 43, "foregong" should read --foregoing--;
　　　　　line 46, "TM" should be deleted;
　　　　　line 50, "TM" should be deleted;
　　　　　line 55, "gase" should read --gas--.

Column 2, line 54, "lated" should read --late--;
　　　　　line 55, after "filtrate" insert --from--.

Column 4, line 25, after "and" insert --at--.

Column 5, line 13, "bisulfitecontaining" should read --bisulfite-containing--;
　　　　　lines 38 and 39, "presence in an amount $Na_2SO_3$" should read --presence of $Na_2SO_3$ in an amount--.

Column 8, line 40, "this" should read --This--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*